(12) United States Patent
Schmidl

(10) Patent No.: US 6,816,541 B1
(45) Date of Patent: Nov. 9, 2004

(54) SPREAD SPECTRUM INTERFERENCE CANCELLATION

(75) Inventor: Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/578,017

(22) Filed: May 24, 2000

Related U.S. Application Data

(60) Provisional application No. 60/135,655, filed on May 24, 1999.

(51) Int. Cl.[7] .............................. H04B 1/69; H04B 7/216
(52) U.S. Cl. ......................... 375/148; 375/144; 370/335
(58) Field of Search ................................ 375/148, 144, 375/147

(56) References Cited

U.S. PATENT DOCUMENTS

| | | | |
|---|---|---|---|
| 5,719,899 A | * | 2/1998 | Thielecke et al. ............ 375/144 |
| 6,175,587 B1 | * | 1/2001 | Madhow et al. ............ 375/148 |
| 6,473,415 B1 | * | 10/2002 | Kim et al. .................. 370/342 |
| 6,501,788 B1 | * | 12/2002 | Wang et al. ................ 375/148 |
| 6,519,477 B1 | * | 2/2003 | Baier et al. ................. 455/562 |
| 6,532,254 B1 | * | 3/2003 | Jokinen ..................... 375/148 |
| 6,600,729 B1 | * | 7/2003 | Suzuki ....................... 370/335 |

OTHER PUBLICATIONS

K lein A., Data detection algorithms specially designed for the downlink of CDMA mobile radio systems, □□ Vehicular Technology Conference, 1997 IEEE 47th, vol.: 1, May 4–7, 1997.*

* cited by examiner

*Primary Examiner*—Emmanuel Bayard
*Assistant Examiner*—Qutbuddin Ghulamali
(74) *Attorney, Agent, or Firm*—Carlton H. Hoel; W. James Brady; Frederick J. Telecky, Jr.

(57) ABSTRACT

Iterative parallel interference cancellation estimations for signals received from multiple coded sources or a source with multiple coded outputs with updated estimates of interfering signals used during an iteration.

11 Claims, 10 Drawing Sheets

= BASE TRANSCEIVER STATION (BTS)
MTSO = MOBILE TELEPHONE SWITCHING OFFICE
= MOBILE UNIT (MOBILE STATION)
- - - = DEDICATED LINES

SPREAD SPECTRUM INTERFERENCE CANCELLATION

CROSS-REFERENCE TO RELATED APPLICATIONS

This application claims priority from provisional application Ser. No. 60/135,655, filed May 24, 1999.

BACKGROUND OF THE INVENTION

1. Field of the Invention

The invention relates to digital communications, and more particularly to spread spectrum communications and related systems and methods.

2. Background

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) the spread spectrum signal for recovery of the corresponding information. FIG. 2 shows a system block diagram, and FIGS. 3a–3b illustrates pseudo-random code plus a QPSK encoder. This multiple access is typically called code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while the remaining interfering signals appear noise-like. For example, the interim standard IS-95 for such CDMA communications employs channels of 1.25 MHz bandwidth and a code pulse interval (chip) $T_c$ of 0.8138 microsecond with a transmitted symbol (bit) lasting 64 chips. The recent wideband CDMA (WCDMA) proposal employs a 3.84 MHz bandwidth and the CDMA code length applied to each information symbol may vary from 4 chips to 256 chips. The CDMA code for each user is typically produced as the modulo-2 addition of a Walsh code with a pseudo-random code (two pseudo-random codes for QPSK modulation) to improve the noise-like nature of the resulting signal. A cellular system as illustrated in FIG. 4 could employ IS-95 or WCDMA for the air interface between the base station and the mobile user station.

A receiver synchronizes with the transmitter in two steps: code acquisition and code tracking. Code acquisition is an initial search to bring the phase of the receiver's local code generator to within typically a half chip of the transmitter's, and code tracking maintains fine alignment of chip boundaries of the incoming and locally generated codes. Conventional code tracking utilizes a delay-lock loop (DLL) or a tau-dither loop (TDL), both of which are based on the well-known early-late gate principle.

In a multipath situation a RAKE receiver has individual demodulators (fingers) tracking separate paths and combines the results to improve signal-to-noise ratio (SNR) according to a method such as maximal ratio combining (MRC) in which the individual detected signals are synchronized and weighted according to their signal strengths. Thus a RAKE receiver typically has a DLL or TDL code tracking loop for each finger together with control circuitry for assigning tracking units to received paths.

A base station detecting many mobile users, each with multipath signals, can improve upon the RAKE detection of each mobile user separately by a joint maximum likelihood detection of all mobile users; this provides optimal detection. However, the computational complexity of the joint maximum likelihood detector precludes practical implementation for situations of more than a few users. Similarly, decorrelating detectors are optimal linear detectors but require large matrix inversions for the case of many users and thus impractical computational complexity.

Interference cancellation attempts to emulate joint maximum likelihood detection with lower computational complexity. In particular, a base station with a RAKE receiver for each mobile user can use estimates of interfering detected other mobile users' signals to cancel them out from its estimation and thereby increase accuracy of the estimates. The interference cancellation can be sequential or in parallel with iterative estimation. Divsalar et al, Improved Parallel Interference Cancellation for CDMA, 46 IEEE Trans. Comm. 258 (1998) describes a parallel interference cancellation method using partial parallel cancellation at each stage of the iterative estimation.

SUMMARY OF THE INVENTION

The present invention provides a spread spectrum system with interference cancellation employing a hybrid of sequential and parallel interference cancellation.

This has advantages including lower computational complexity than comparable parallel cancellation.

BRIEF DESCRIPTION OF THE DRAWINGS

The drawings are heuristic for clarity.

DESCRIPTION OF THE PREFERRED EMBODIMENTS

1. Overview

Figure 1:
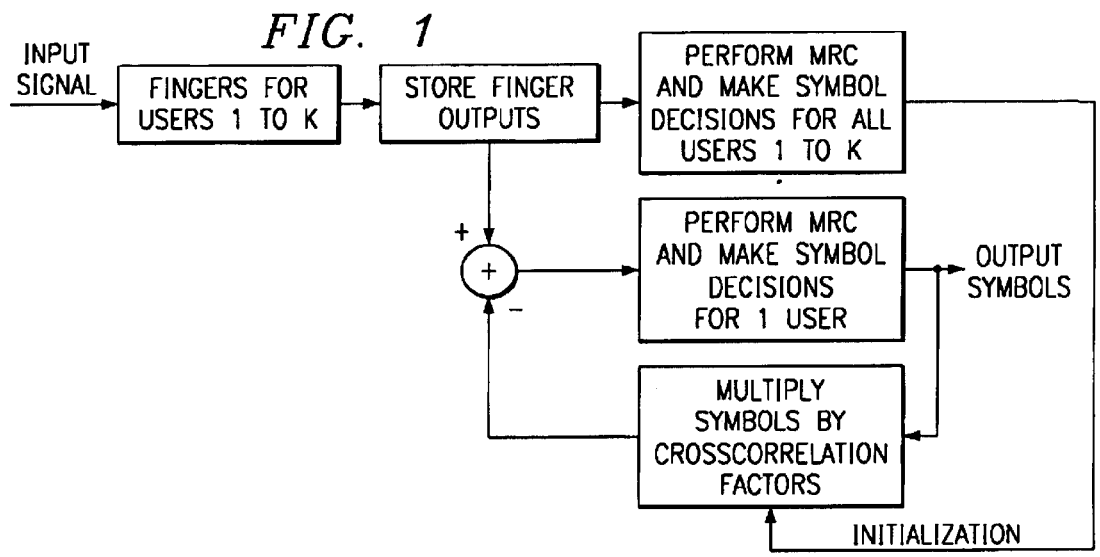
FIGS. 1a–1b are flow diagrams of a first preferred embodiment.
Figure 2:
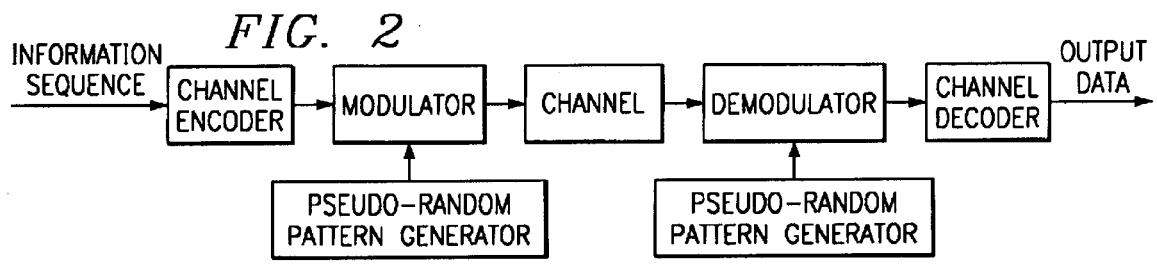
FIG. 2 shows a spread spectrum system.

The preferred embodiment interference cancellation methods apply to spread spectrum communications systems with multiple mobile users and include an iterative parallel interference cancellation but with sequential updating of the estimates during each stage of the iteration. This improves estimation accuracy and lowers the number of stages required for a given accuracy. FIGS. 1a–1b is a flow diagrams using a RAKE receiver (fingers) and maximal ratio combining (MRC) plus the sequential updating within an interference cancellation iteration of the symbol estimations.

In preferred embodiment spread spectrum communications systems the base stations and the mobile users could each include digital signal processors (DSP's) or other programmable devices with stored programs for performance of the signal processing together with analog integrated circuits for amplification of inputs to or outputs from antennas and conversion between analog and digital. The stored programs may, for example, be in ROM onboard the processor or in external flash EEPROM. The antennas may be parts of RAKE detectors with multiple fingers for each user's signals. The DSP's could be TMS320C6x DSP's from Texas Instruments.

2. Synchronous with Total Cancellation

Figure 3A:
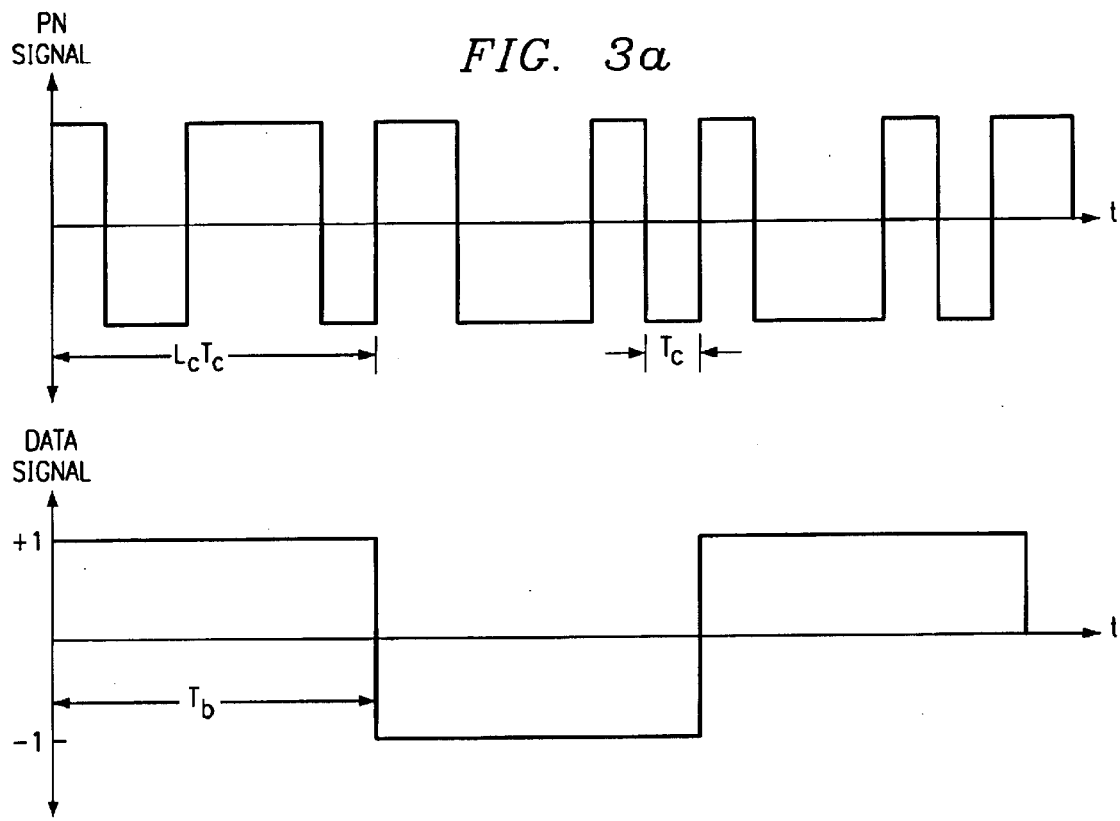
FIGS. 3a–3b illustrate pseudo-random code and symbols.

First, consider the simplest case of a CDMA system with mobile users' signals as binary phase-shift keyed and synchronously received at a base station which employs iterative parallel interference cancellation. Description of the preferred embodiment hybrid sequential-parallel interference cancellation follows a description of parallel interference cancellation (PIC). Initially, let $C_m(t)$ be the code (chip sequence) for the $m^{th}$ mobile and $u_m$ the corresponding bit; see FIG. 3a. The received (complex) signal in baseband at the base station is $$r(t) = \Sigma \sqrt{S_m} u_m C_m(t) \exp(\iota \phi_m) + n(t)$$

with the sum over the mobile users, $S_m$ is the received power of the $m^{th}$ user's signal, $\phi_m$ is its carrier phase, and $n(t)$ is a noise term. The base station has a detector tracking each user's signal, and for correlations over the bit (symbol) interval $0 \leq t \leq T_b$ this yields for the $m^{th}$ user detector:

$$r_m = 1/T_b \int r(t) C_m(t) dt = \sqrt{S_m} u_m \exp(\iota \phi_m) + \Sigma \sqrt{S_n} u_n R_{m,n} \exp(\iota \phi_n) + n_m$$

where the integration range is over the symbol interval; the sum is over n; $R_{m,n}$ is the cross-correlation of the codes for the $m^{th}$ and $n^{th}$ users over the bit interval ($R_{m,n} = 1/T_b \int C_m(t) C_n(t) dt$ but with $R_{m,m}=0$), and $n_m = 1/T_b \int n(t) C_m(t) dt$. The received signal $r(t)$ is sampled at a rate typically 4 times the chip rate, and the integrations are sums.

Then set $y_m = r_m \sqrt{2 T_b / N_o}$ to normalize the projection of the received signal on the $m^{th}$ code where $N_o$ is the noise power density and set $E_n = S_n T_b$ which is the bit energy in the $n^{th}$ user's signal. This gives:

$$y_m \exp(-\iota \phi_m) = \sqrt{2 E_m / N_o} u_m + \Sigma \sqrt{2 E_n / N_o} u_n R_{m,n} \exp(\iota(\phi_n - \phi_m)) + z_m \exp(-\iota \phi_m)$$

where $z_m \exp(-\iota \phi_m)$ is a normal random variable with zero mean and variance 2 (variance 1 in each real dimension). Then taking the real parts of these equations gives:

$$Y_m = \sqrt{2 E_m / N_o} u_m + I_m + N_m$$

where $Y_m = \text{Re}\{y_m \exp(-\iota \phi_m)\}$, $I_m$ is the real part of the multi-user interference experienced by user m due to the other users, and $N_m$ is a normal random variable with zero mean and variance 1. Then let $\hat{I}_m$ be an estimate for $I_m$ based on estimates of the other users' data bits, so $I_m - \hat{I}_m$ represents the residual (uncancelled) real multiuser interference. Hence, $$Y_m = \sqrt{2 E_m / N_o} u_m + \hat{I}_m + W_m$$

where $W_m = I_m - \hat{I}_m + N_m$ will be modeled as a normal random variable. Because estimates of the other users' data bits are not available at the time that user m's data bit is being estimated, invoke a multistage iterative process in which estimates for the other users' data bits are obtained from the previous stage. Partial cancellation in each stage with linear or non-linear maximum likelihood decision statistics are described in the following section, but first look at total cancellation in each stage.

Let $\hat{u}_n(k)$ be the $k^{th}$ stage estimate for $u_n$. There is no information beyond the received signals to start with, so take the initial stage (k=0) estimates for the data bits as $\hat{u}_n(0) = \text{sgn}\{Y_n\}$. Similarly, let the k stage estimate for the interference be $\hat{I}_m(k) = \text{Re}\{\Sigma \sqrt{2 E_n / N_o} \hat{u}_n(k-1) R_{m,n} \exp(\iota(\phi_n - \phi_m))\}$. Then with $W_m(k) = I_m - \hat{I}_m(k) + N_m$, the $k^{th}$ stage data bit equations become for $1 \leq m \leq \text{number\_of\_users}$:

$$Y_m = \sqrt{2 E_m / N_o} u_m + \hat{I}_m(k) + W_m(k)$$

So estimate $u_m$ by $$\hat{u}_m(k) = \text{sgn}\{Y_m - \hat{I}_m(k)\}$$

Preferred embodiments of total cancellation modify $\hat{I}_m(k)$ to include available updated estimates of the $u_n$. In particular, presume the order of computation of the estimates $\hat{u}_m(k)$ is with increasing m, then modify the estimated interference to be:

$$\hat{I}_m(k) = \text{Re}\{\Sigma_{n<m} \sqrt{2 E_n / N_o} \hat{u}_n(k) R_{m,n} \exp(\iota(\phi_n - \phi_m)) + \Sigma_{n>m} \sqrt{2 E_n / N_o} \hat{u}_n(k-1) R_{m,n} \exp(\iota(\phi_n - \phi_m))\}$$

That is, once an estimate of a user's data bit in stage k is made (i.e., $\hat{u}_n(k)$), use this estimate in subsequent interference estimates $\hat{I}_m(k)$ during stage k. Thus the estimation is a hybrid of parallel (staged iterations) and sequential (estimate in order using most recent estimates of other data bits) estimations.

The iteration can be expressed in matrix format as follows $$Y(j+1) = Y(0) - R \hat{A}(j) \hat{u}(j)$$

in which the index indicates the iteration stage. Written out this is:

$$\begin{bmatrix} Y_1(j+1) \\ Y_2(j+1) \\ Y_3(j+1) \\ \vdots \\ Y_k(j+1) \end{bmatrix} = \begin{bmatrix} Y_1(0) \\ Y_2(0) \\ Y_3(0) \\ \vdots \\ Y_k(0) \end{bmatrix} - \begin{bmatrix} R_{1,1} & R_{1,2} & R_{1,3} & \ldots & R_{1,k} \\ R_{2,1} & R_{2,2} & R_{2,3} & \ldots & R_{2,k} \\ R_{3,1} & R_{3,2} & R_{3,3} & \ldots & R_{3,k} \\ \vdots & \vdots & \vdots & \ddots & \vdots \\ R_{k,1} & R_{k,2} & R_{k,3} & \ldots & R_{k,k} \end{bmatrix} \begin{bmatrix} \hat{A}_1(j) \hat{u}_1(j) \\ \hat{A}_2(j) \hat{u}_2(j) \\ \hat{A}_3(j) \hat{u}_3(j) \\ \vdots \\ \hat{A}_k(j) \hat{u}_k(j) \end{bmatrix}$$

In the foregoing $R_{m,m} = 0$, the $m^{th}$ component of the vector $Y(0)$ is the detected received signal:

$$Y_m(0) = \sqrt{2 T_b / N_o} r_m = \sqrt{2 / T_b N_o} \int r(t) C_m(t) dt$$

the estimate of the $m^{th}$ bit derived during the $j^{th}$ stage of the iteration is $\hat{u}_m(j)$, and the channel estimates during the $j^{th}$ stage are $$\hat{A}_m(j) = \sqrt{S_m} \exp(\iota \phi_m)$$

Heuristically, $Y_m(j+1) = \sqrt{2 E_m / N_o} \hat{u}_m(j+1) \exp(\iota \phi_m)$, so estimate during the $j+1^{st}$ stage by $$\hat{u}_m(j+1) = \text{sgn}[\text{Re}\{\exp(-\iota \phi_m) Y_m(j+1)\}]$$

And initialize (j=0 stage) by $\hat{u}_m(0) = \text{sgn}[\text{Re}\{\exp(-\iota \phi_m) Y_m(0)\}]$ The preferred embodiment total cancellation can then be expressed as the sequential updatings in the iteration stage:

$$Y_1(j+1) = Y_1(0) - [R_{1,1} \quad R_{1,2} \quad R_{1,3} \quad \ldots \quad R_{1,k}] \begin{bmatrix} \hat{A}_1(j) \hat{u}_1(j) \\ \hat{A}_2(j) \hat{u}_2(j) \\ \hat{A}_3(j) \hat{u}_3(j) \\ \vdots \\ \hat{A}_k(j) \hat{u}_k(j) \end{bmatrix}$$

From $Y_1(j+1)$ make the new $(j+1^{st})$ estimate $\hat{u}_1(j+1)$ of the bit for user 1 and include this in the computation for the second component of $Y_2(j+1)$.

$$Y_2(j+1) = Y_2(0) - [R_{2,1} \quad R_{2,2} \quad R_{2,3} \quad \ldots \quad R_{2,k}] \begin{bmatrix} \hat{A}_1(j+1)\hat{u}_1(j+1) \\ \hat{A}_2(j)\hat{u}_2(j) \\ \hat{A}_3(j)\hat{u}_3(j) \\ \vdots \\ \hat{A}_k(j)\hat{u}_k(j) \end{bmatrix}$$

From $Y_2(j+1)$ make new estimate of $\hat{u}_2(j+1)$ for user 2. Then $$Y_3(j+1) = Y_3(0) - [R_{3,1} \quad R_{3,2} \quad R_{3,3} \quad \ldots \quad R_{3,k}] \begin{bmatrix} \hat{A}_1(j+1)\hat{u}_1(j+1) \\ \hat{A}_2(j+1)\hat{u}_2(j+1) \\ \hat{A}_3(j)\hat{u}_3(j) \\ \vdots \\ \hat{A}_k(j)\hat{u}_k(j) \end{bmatrix}$$

and so forth.

FIG. 1b illustrates this sequential updating interference cancellation in the (m+1)th iteration for n users: detectors 101–104 to provide the $Y_1(0), \ldots, Y_k(0), \ldots, Y_j(0), \ldots, Y_n(0)$ and channel estimates; first estimators 111–114 initially provide the detector outputs plus prior iteration estimates $\hat{u}_1(m), \ldots, \hat{u}_k(m), \ldots, \hat{u}_j(m), \ldots, \hat{u}_n(m)$; and the second estimators 121–124 use the cross correlation plus prior estimates to serially compute the current stage the $Y_1(m+1), \ldots, Y_k(m+1), \ldots, Y_j(m+1), \ldots, Y_n(m+1)$ and thus the estimates $\hat{u}_1(m+1), \ldots, \hat{u}_k(m+1), \ldots, \hat{u}_j(M+1), \ldots, \hat{u}_n(m+1)$ while updating the first estimators. In particular, second estimator 123 computes $Y_j(m+1)$ and $\hat{u}_j(m+1)$ using the jth detector output plus interference estimates based on the cross correlation and current iteration estimates $\hat{u}_1(m+1), \ldots, \hat{u}_{j-1}(m+1)$, plus the prior iteration estimates $\hat{u}_{j+1}(m), \ldots, \hat{u}_n(M)$ which have not yet been updated.

The last elements of the vector $\hat{u}(j+1)$ can be estimated quite accurately since updated estimates of the other users have already been incorporated. If the users all have equal power, then the bit error rates (BER) will not be equal for all the users since the ones updated first will have a higher BER. However, as shown in the simulations below, the worst case BER with the preferred embodiment parallel cancellation with serial updates (PCSU) will be better than the BER obtained with PIC, and the average BER is greatly improved with PCSU. It is also possible to obtain this average BER for all users by changing the order of cancellation from one code period window (256 chips) to the next. Finally, PCSU is a good way to implement interference cancellation for multi-rate and multiple quality-of-service users since the users with the largest $E_b/N_o$ values can be updated first.

4. Synchronous with Partial Cancellation Iteration

The total interference cancellation at each stage of the iteration can be replaced by alternatives that only partially cancel the interference in some stages and this leads to better results. Again use $$Y_m = \sqrt{2E_m/N_o} u_m + \hat{I}_m(k) + W_m(k)$$

But now estimate $\hat{u}_m(k)$ at the $k^{th}$ stage essentially as a weighted sum of an predecision estimate of $\hat{u}_m(k-1)$, $Y_m$, and $\hat{I}_m(k)$ with the weighting increasing the interference cancellation in successive stages. In particular, redefine $$Y_m(k) = \sqrt{2E_m/N_o} u_m + Z_m(k)$$

where $Z_m(k)$ is assumed to be a normal random variable with zero mean and variance depending upon k, and $Z_m(k-1)$ and $W_m(k)$ are correlated because both include the noise $N_m(k-1)$ and residual interferences $I_m( ) - \hat{I}_m( )$ of prior stages. $Y_m(k)$ will be recursively found as the log-likelihood ratio for $u_m$ given $Y_m(k-1)$, $Y_m$, and $\hat{I}_m(k)$ together with initialization by $Y_m(0) = Y_m$. Thus the estimate at the k stage is then:

$$\hat{u}_m(k) = \text{sgn}\{p(Y_m - \hat{I}_m(k)) + (1-p)Y_m(k)\}$$

where p is a factor derived from the variances and correlation of $W_m$ and $Z_m$. Simulations yield choices for p.

Non-linear soft decisions for $\hat{u}_m(k)$ can also be used with a hard decision (±1) only at the last stage of the iteration. Indeed, Divsalar et al has soft decisions such as $\hat{u}_m(k) = \tanh(q(k)Y_m(k))$ where q(k) is a constant depending upon the variances and correlation of $W_m$ and $Z_m$. Again, simulations yield optimal values for these parameters.

Preferred embodiments again follow the foregoing but modify $\hat{I}_m(k)$ to include updated estimates of the $u_n$. In particular, presume the order of computation of the estimates $\hat{u}_m(k)$ is with increasing m, then modify the estimated interference to be:

$$\hat{I}_m(k) = \text{Re}\{\Sigma_{n<m} \sqrt{2E_n/N_o} \hat{u}_n(k) R_{m,n} \exp(\iota(\phi_n - \phi_m)) + \Sigma_{n>m} \sqrt{2E_n/N_o} \hat{u}_n(k-1) R_{m,n} \exp(\iota(\phi_n - \phi_m))\}$$

That is, once an estimate of a user's data bit in stage k is made (i.e., $\hat{u}_n(k)$), use this estimate in subsequent interference estimates $\hat{I}_m(k)$ during stage k. Thus the estimation is a hybrid of parallel (staged iterations) and sequential (estimate in order using most recent estimates of others) estimations. Note that this applies in both hard and soft decision versions.

5. Asynchronous Multipath

With a short code (256 chips) on the uplink from mobile user to base station, parallel interference cancellation (PIC) can be done at the symbol level and becomes computationally simpler than regenerating the interference and subtracting at the chip level. The crosscorrelations are computed between all the symbols in the 256-chip window. Because the signals arrive asynchronously the window must be extended by one or two symbols on each side to include any symbols which partially enter the window. The base station first uses the conventional RAKE receiver to demodulate all the users in the cell. For each symbol in the window one row of the crosscorrelation matrix is used to cancel the interference. The crosscorrelation values are multiplied by the initial data estimates for the interfering signals and subtracted from the desired symbol. This completes one stage of PIC. Additional stages are accomplished by starting with the original RAKE output for the desired symbol and subtracting the interference calculated by multiplying the row of the crosscorrelation matrix by the improved estimates of the interfering symbols.

Figure 5:
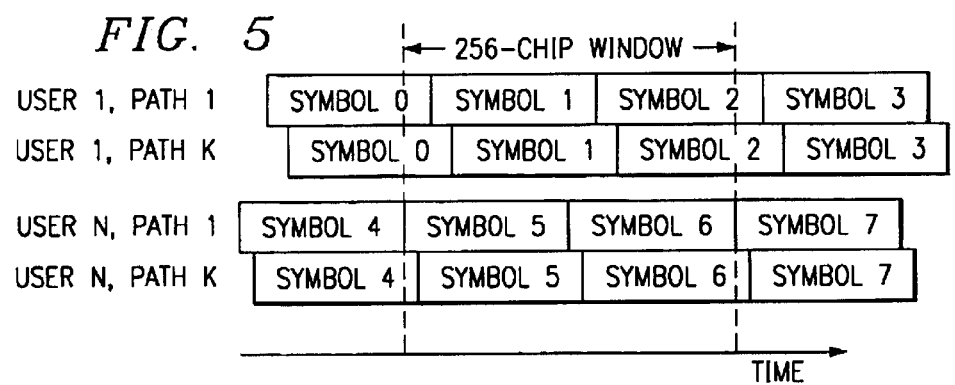
FIG. 5 indicates multiuser multipath timing.

FIG. 5 shows an example of symbol timing for asynchronous users. Since the periodicity in the short code is 256 chips, a window of 256 chips can be selected arbitrarily. In WCDMA the length of each symbol will be 4, 8, 16, 32, 64, 128, or 256 chips. Within the window the desired symbols can be chosen to be any symbols that start within the window, so in FIG. 5 the desired symbols are labeled as Symbol 1, 2, 5, and 6. Then by breaking the frame into 256 chip windows PIC can be performed on all the symbols. The symbols labeled Symbol 0 and 4 in FIG. 5 belong to the previous window, so it can be assumed that PIC has already been performed on them and that reliable data estimates for them have already been made. A crosscorrelation matrix can be formed which includes the correlations of any of the desired symbols with any other symbols that overlap them. The matrix does not have to be square since it can include overlapping symbols that are not desired symbols. The crosscorrelation between the $i_1$ symbol of finger $k_1$ of user $m_1$ and the $i_2$ symbol of finger $k_2$ of user $m_2$ can be calculated as $$R_{(i_1,m_1,k_1),(i_2,m_2,k_2)} = \int c_{i_1,m_1}(t - \tau_{i_1,m_1,k_1}) c^*_{i_2,m_2}(t - \tau_{i_2,m_2,k_2})$$

The term $c_{i,m}$ is the chip sequence for the $i^{th}$ symbol of user m, the term $\tau_{i,m,k}$ is the time delay of the $i^{th}$ symbol of finger k of user m, and (.)* denotes the complex conjugation operation (e.g., QPSK). The advantage of using short codes on the uplink is that the crosscorrelation matrix does not change from one 256-chip window to the adjacent window, and the matrix does not have to be updated until the relative path delays of a user change. The diagonal terms in the matrix R corresponding to the same symbol, finger, and path ($i_1 = i_2$, $m_1 = m_2$, and $k_1 = k_2$ in the equation) can be set to 0 since the interference cancellation should not cancel out the desired signal. Let the vector of matched filter outputs be denoted Y(0), where the index 0 identifies the $0^{th}$ iteration. The parallel interference cancellation iteration is then $$Y(j+1) = Y(0) - R\hat{A}(j)\hat{u}(j)$$

where $\hat{A}(j)$ is the vector of channel estimates for all the paths and users in the $j^{th}$ iteration of the interference canceller and $\hat{u}(j)$ is the vector of estimates of the data symbols. More explicitly, this matrix equation is:

$$\begin{bmatrix} Y_1(j+1) \\ Y_2(j+1) \\ Y_3(j+1) \\ \vdots \\ Y_k(j+1) \end{bmatrix} = \begin{bmatrix} Y_1(0) \\ Y_2(0) \\ Y_3(0) \\ \vdots \\ Y_k(0) \end{bmatrix} - \begin{bmatrix} R_{1,1} & R_{1,2} & R_{1,3} & \ldots & R_{1,k} \\ R_{2,1} & R_{2,2} & R_{2,3} & \ldots & R_{2,k} \\ R_{3,1} & R_{3,2} & R_{3,3} & \ldots & R_{3,k} \\ \vdots & \vdots & \vdots & \ddots & \vdots \\ R_{k,1} & R_{k,2} & R_{k,3} & \ldots & R_{k,k} \end{bmatrix} \begin{bmatrix} \hat{A}_1(j)\hat{u}_1(j) \\ \hat{A}_2(j)\hat{u}_2(j) \\ \hat{A}_3(j)\hat{u}_3(j) \\ \vdots \\ \hat{A}_k(j)\hat{u}_k(j) \end{bmatrix}$$

After each iteration of the interference canceller, the terms for each of the paths of a user for one symbol are combined (usually using a maximal ratio combiner, MRC), and a decision on the symbol is made to find the data estimate. Of course, the data on any pilot symbols is already known, and the data for any symbols belonging to previous windows is assumed to have been already accurately estimated. The performance of the parallel interference canceller can be analyzed for a 2-path, additive white Gaussian noise (AWGN) channel with equal power in each path. Perfect channel estimation is assumed here. The SIR (ratio of signal power to noise-plus-interference power) for the conventional RAKE receiver (no interference cancellation) is given by $$SIR_{CONV} = \frac{2\left(\frac{s}{2}\right)}{\eta + \left(\frac{s}{2}\right)\left(\frac{2N-1}{h}\right)} = \frac{1}{\frac{1}{SNR} + \frac{2N-1}{2h}}$$

where the signal power is s, noise power is $\eta$, spreading factor is h and there are N users in the cell. The bit error rate (BER) can be found the taking the Q function of the square root of the (2 $E_b/N_o$), which is equivalent to SIR when QPSK modulation is used.

$$BER_{CONV} = Q\left(\sqrt{2\frac{E_b}{N_o}}\right) = Q(\sqrt{SIR_{CONV}})$$

The SIR for each stage of PIC can be found by noting that if a bit is correct, then the interference after cancellation is zero; and if it is incorrect, then the interference power increases by a factor of 4. For a BPSK signal, an incorrect decision results in the interference signal doubling and the interference power quadrupling. The same result occurs for QPSK signals if the math for the various cases is worked out. After one stage of PIC, the SIR is $$SIR_{1-STAGE-PIC} = \frac{1}{\frac{1}{SNR} + \frac{2N-1}{2h}(4)Q(\sqrt{SIR_{CONV}})}$$

Note that the calculations of this section are made under the assumption that the residual interference is uncorrelated with the symbol decisions and thus ignores the bias discussed below. The SIR for subsequent stages is computed by placing the SIR of the previous stage inside the Q-function:

$$SIR_{j+1-STAGE-PIC} = \frac{1}{\frac{1}{SNR} + \frac{2N-1}{2h}(4)Q(\sqrt{SIR_{j-STAGE-PIC}})}$$

The number of iterations for interference cancellation should be minimized to reduce the amount of memory required and the computational complexity of the algorithm. The idea behind the preferred embodiment parallel cancellation with serial updates (PCSU) is to use the latest estimates of each data symbol.

Generally, with parallel interference cancellation (PIC) the maximal ratio combination (MRC) and new estimates of $\hat{u}(j)$ are not made until a stage is completed. However, after the rows of the matrix R corresponding to the K fingers of one symbol of one user are applied to the old estimates, it is possible to immediately update the estimate of that particular symbol. Thus the elements of the vector $\hat{u}(j)$ can be updated element by element during one stage of interference cancellation. In particular, $$Y_1(j+1) = Y_1(0) - [R_{1,1} \quad R_{1,2} \quad R_{1,3} \quad \ldots \quad R_{1,k}] \begin{bmatrix} \hat{A}_1(j)\hat{u}_1(j) \\ \hat{A}_2(j)\hat{u}_2(j) \\ \hat{A}_3(j)\hat{u}_3(j) \\ \vdots \\ \hat{A}_k(j)\hat{u}_k(j) \end{bmatrix}$$

From $Y_1(j+1)$ make the new $(j+1^{st})$ estimate $\hat{u}_1(j+1)$ of the bit for user 1 and include this in the computation for the second component of $Y_2(j+1)$.

$$Y_2(j+1) = Y_2(0) - [R_{2,1} \quad R_{2,2} \quad R_{2,3} \quad \ldots \quad R_{2,k}] \begin{bmatrix} \hat{A}_1(j+1)\hat{u}_1(j+1) \\ \hat{A}_2(j)\hat{u}_2(j) \\ \hat{A}_3(j)\hat{u}_3(j) \\ \vdots \\ \hat{A}_k(j)\hat{u}_k(j) \end{bmatrix}$$

From $Y_2(j+1)$ make new estimate of $\hat{u}_2(j+1)$ for user 2. Then $$Y_3(j+1) = Y_3(0) - [R_{3,1} \quad R_{3,2} \quad R_{3,3} \quad \ldots \quad R_{3,k}] \begin{bmatrix} \hat{A}_1(j+1)\hat{u}_1(j+1) \\ \hat{A}_2(j+1)\hat{u}_2(j+1) \\ \hat{A}_3(j)\hat{u}_3(j) \\ \vdots \\ \hat{A}_k(j)\hat{u}_k(j) \end{bmatrix}$$

and so forth.

FIG. 1b again shows the sequential updating of the estimations during an iteration. FIG. 1a shows reception with a RAKE detector having the multiple fingers 151 for each user with the maximal ratio combining (MRC) for initial estimates 153, crosscorrelations with updated estimates 155, and sequential (MRC) estimations with interference cancellation 157.

Figure 7:
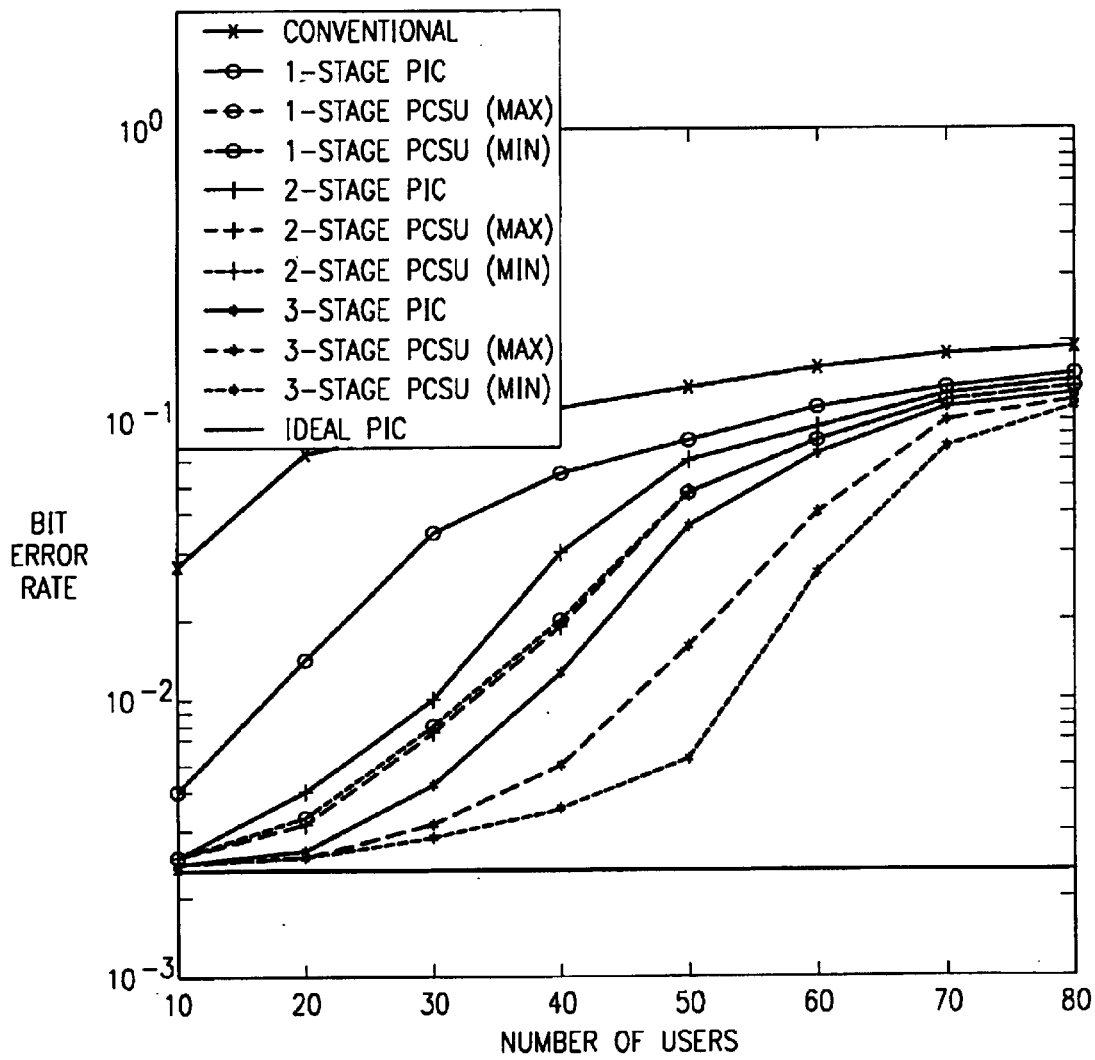

The last elements of the vector $\hat{u}_j$ can be estimated quite accurately since updated estimates of the other users have already been incorporated. If the users all have equal power, then the bit error rates will not be equal for all the users since the ones updated first will have a higher BER. However, as shown in the simulations below, the worst case BER with preferred embodiment PCSU will be better than the BER obtained with PIC, and the average BER is greatly improved with PCSU. It is also possible to obtain this average BER for all users by changing the order of cancellation from one window to the next. Finally, PCSU is a good way to implement interference cancellation for multirate and multiple quality-of-service users since the users with the largest $E_b/N_o$ values can be updated first. The SIR for PCSU can be found for the 2-path AWGN channel. In there are N users, the SIR for the $m^{th}$ user to be updated is given by:

for 2 iterations of PCSU is lower than the BER for 3 iterations of PIC. If the desired raw BER is 0.10, then the conventional RAKE receiver can support 31.5 users, and PIC can support 52.1, 61.6 and 66.8 users with 1, 2, and 3 stages, respectively. PCSU can support 58.2, 68.2, and 72.6 users with 1, 2, and 3 stages, respectively. The capacity gain for the 2-path AWGN channel is 11.5%, 10.7%, and 8.7% for 1, 2, and 3 stages, respectively, for PCSU over PIC. FIG. 7 shows the range of BER values for PCSU in each stage. In the first stage, the first estimated symbol has the same BER as PIC since no symbols have been updated yet. The lowest BER for the first stage of PCSU is almost the same at the highest BER of the second stage. This occurs because the reduction in interference is a continuous process with each update reducing the interference.

Thus PCSU provides about a 10% increase in capacity (for the 2-path AWGN channel) over PIC when using the same number of stages (1, 2, or 3 stages). Alternatively PCSU can be used with a fewer number of stages than PIC to get the same level of performance at a lower computational complexity. This gain is obtained by performing the maximal ratio combiner and estimator update at the end of every symbol instead of at the end of a block. The same computations must be performed in any case, so for any particular stage the amount of computation for PCSU and PIC is the same. Finally, by ordering the symbols by received power levels, PCSU can be used for interference cancellation of signals with multiple rates and multiple quality-of-service requirements Interference cancellation at the base station is a technique that can increase the uplink capacity in a WCDMA system by 100% or more. In order to facilitate base station interference cancellation, the WCDMA standard allows the base station to instruct the mobiles within its cell to use short codes on all uplink transmissions. The length of the short code is equal to the length of the largest spreading factor supported by the system, which is usually 256 chips. The short codes introduce a periodicity to the interference that can be exploited by interference cancellation algorithms. Of all the types of interference cancellation algorithms studied, parallel interference cancellation (PIC) at the symbol level gives the best performance at a reasonable level of complexity. A parallel interference canceller performs matched filtering on paths of every user. After maximal ratio combining, a decision can be made for the symbols of every $$SIR_{1-STAGE-PCSU}(m) = \cfrac{1}{\cfrac{1}{SNR} + 2\left[\sum_{i=1}^{m-1} \cfrac{4}{2h} Q\left(\sqrt{SIR_{1-STAGE=PCSU}(i)}\right)\right] + \cfrac{2(N-m)+1}{2h}(4)Q\left(\sqrt{SIR_{CONV}}\right)}$$

The SIR for subsequent stages is found to be:

user. In order to cancel the interference, the cross correla- $$SIR_{j+1-STAGE-PCSU}(m) = \cfrac{1}{\cfrac{1}{SNR} + 2\left[\sum_{i=1}^{m-1} \cfrac{4}{2h} Q\left(\sqrt{SIR_{j+1-STAGE=PCSU}(i)}\right)\right] + \cfrac{4}{2h}Q\left(\sqrt{SIR_{1-STAGE=PCSU}(m)}\right) + 2\sum_{i=m+1}^{N} \cfrac{4}{2h}Q\left(\sqrt{SIR_{j-STAGE=PCSU}(i)}\right)}$$

Figure 6:
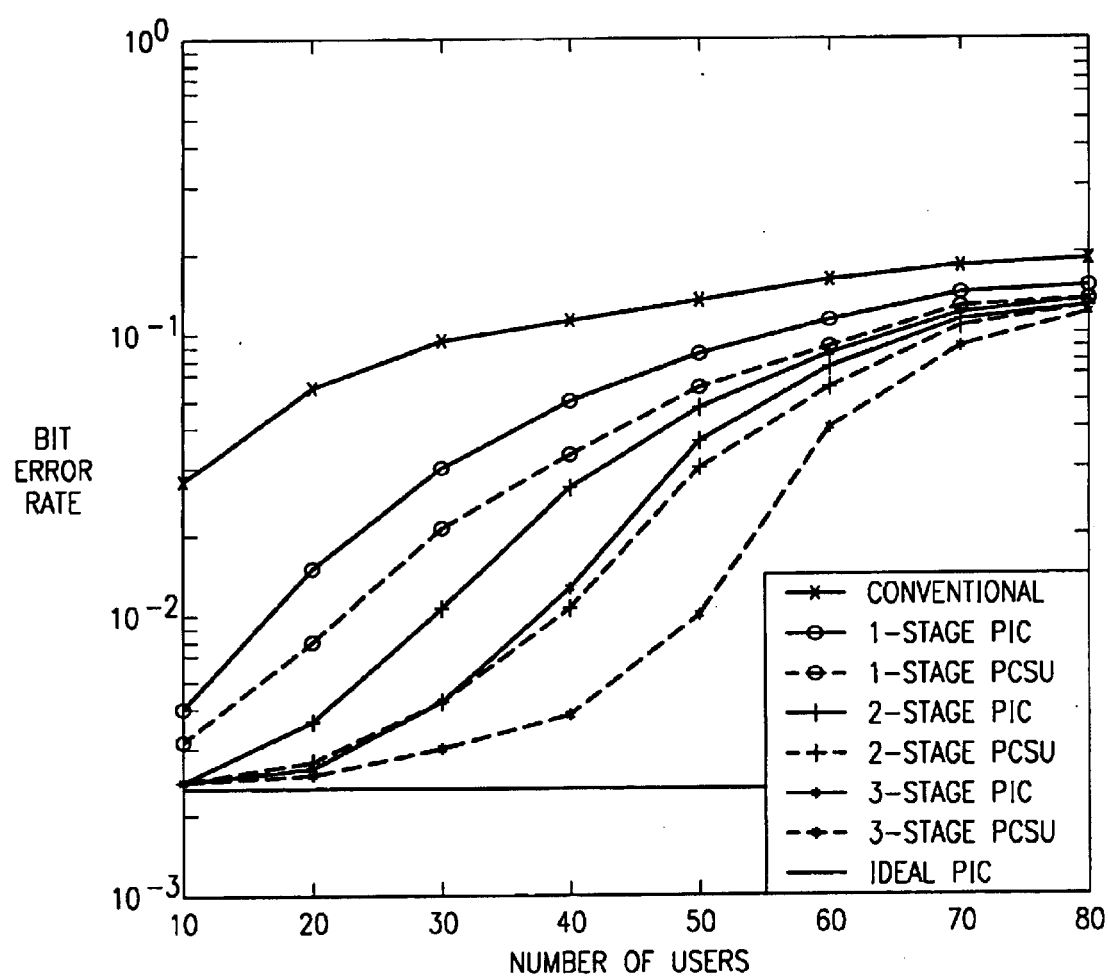

FIG. 6 compares the performance of PIC and PCSU for the 2-path AWGN channel using the foregoing equations. Each of the two paths has an $E_b/N_o$ of 3 dB, and perfect channel estimation is assumed. The average BER for PCSU is plotted in this figure. It can be seen that the average BER tions between each path of every user are computed. Let there be K users with L paths per user and M symbols per user that start in the window of 256 chips. The signals from each user arrive asynchronously, so the cross correlation matrix must be extended to include symbols that partially enter the window. If the cross correlations with one extra symbol on each side of the window are included in the matrix, then the cross correlation matrix will be (KLM)×[KL(M+2)]. From one window of 256 chips to the next window, the same cross correlation matrix can be used since all the mobiles transmit with a short code. The matrix only needs to be updated when the relative positions of the paths change or when users enter or leave the system. For each symbol in the window one row of the crosscorrelation matrix is used to cancel the interference. The crosscorrelation values are multiplied by the RAKE outputs for the interfering signals and subtracted from the desired symbol. This completes one stage of PIC. Additional stages are accomplished by starting with the original RAKE output for the desired symbol and subtracting the interference calculated by multiplying the row of the crosscorrelation matrix by the improved estimates of the interfering symbols. The base station knows the code and timing of all the users within its cell including any users that are in soft handoff with the base station. Any users in adjacent cells too weak to be in soft handoff are not cancelled.

It is known that the decision statistics are biased when using a linear parallel interference canceller (soft decisions). The conditional expectation of the decision statistic $Z_i$ given the correct transmitted bit $b_i$ is $$E[Z_i|b_i] = b_i\left[1 - \frac{C(K-1)}{3N}\right]$$

where K is the number of users, N is the spreading factor, and C is the fraction of interference cancelled in the first stage. The effect of the bias is strongest in the first stage and decreases in subsequent stages.

The bias in stage s (with total cancellation in each stage) is given by $(-K/(3N))^s$. By reducing C, the bias in the first stage can be reduced. The use of hard decisions also results in a lower bias. Simulations show that the amount of bias is reduced by about 30% when using hard decisions instead of soft decisions. Also, it is known that using a partial interference canceller gives better performance than total canceling the interference in each stage.

The standard parallel interference canceller is implemented by multiplying the cross correlation matrix by the data estimates to find the interference. After subtracting the interference from the original matched filter outputs, maximal ratio combining is performed and data decisions for the stage are made. If the maximal ratio combining is done and the data decision is made after the cancellation is performed for one user, the data estimate vector can be updated after each user is processed. This requires no extra computation since the same operations are performed in a different order from the standard PIC. The parallel canceller with serial updates (PCSU) combines elements of parallel and serial cancellation. Since the latest data estimates are always used, PCSU should outperform the standard PIC in general. PCSU also reduces the effect of bias that was discussed earlier.

7. Hard Decisions

Let the received signals for a user with two paths be $$r_1 = dc_1 + n_1 \quad r_2 = dc_2 + n_2$$

where d is the data symbol, $c_1$ and $c_2$ represent the channel, and $n_1$ and $n_2$ are the additive noise terms. After maximal ratio combining, the decision statistic is $$Z_{hard} = r_1\hat{c}_1^* + r_2\hat{c}_2^*$$

The received symbols are multiplied by the conjugates of the channel estimates. To make a hard decision on the QPSK symbol, the sign of the real and imaginary part of Z are found as given below $$\hat{d}_{hard} = \text{sign}(\text{real}(Z_{hard})) + j\,\text{sign}(\text{imag}(Z_{hard}))$$

The interference can be found by multiplying the data estimate by the channel and the cross correlation coefficient. The multiplication by the data estimate is simple because the real and imaginary parts are one-bit numbers.

8. Soft Decisions

Soft decisions can be computed by treating each path of each user as a separate user. Then no decision needs to be made at each stage since the decision would be made after dividing by the channel estimate, and then the interference would be found by multiplying by the channel estimate. Because all the operations in this scheme are linear, interference cancellation can be implemented by computing one matrix and multiplying the RAKE outputs by this matrix. However, each single path usually has a very low SNR, and decisions made on a single path are unreliable. Simulations show that using soft decisions on single paths performs worse than not doing interference cancellation at all in the SNR regions of interest.

Maximal ratio combining can be used before making a soft decision. This improves the SNR and the quality of the decision. After maximal ratio combining, the decision statistic is $$Z_{soft} = \frac{r_1\hat{c}_1^* + r_2\hat{c}_2^*}{|\hat{c}_1|^2 + |\hat{c}_2|^2}$$

This statistic is different from the hard decision statistic because of the normalization by the energy of the channel estimates. Instead of implementing the division in hardware or on a DSP, a lookup table of about 1000 elements can be used to find the inverse of the denominator so that multiplication can be used. The data estimates can be clipped if the absolute value of the real or imaginary part is greater that 1. The soft decision is then found by $$\hat{d}_{soft} = \text{clip}(\text{real}(Z_{soft})) + j\,\text{clip}(\text{imag}(Z_{soft}))$$

As with the hard decision, the interference can be found by multiplying the data estimate by the channel and the cross correlation coefficient. However the multiplication by the data estimate now requires multiplication by a 6 or 8 bit number.

9. Number of Operations for Hard and Soft Decisions

Let there be 40 mobile users in the cell and 2 fingers assigned to each mobile, and let the spreading factor be 64 for every user. Because of the asynchronous arrival of the signal from each user, every symbol will probably have a partial overlap with 2 symbols of every other user. For each path of each user (39×2×2)=156 cross correlations need to be computed. The cross correlation only needs to be calculated once for every pair of symbols, so this number can be divided by 2. Each correlation requires at most 64 1-bit complex multiplies and 63 complex adds of the results. There are a total of (40 users)(4 symbols)(2 fingers)(78 correlations)=24960 correlations/window. The total number of "simple operations" is 24960(127)=3.17 million "simple"

operations/window. This correlation matrix only needs to be changed when the relative path delays change. If the matrix is recomputed once per frame, then 317 million "simple" operations are required per second. This requirement is the same whether hard or soft decisions are used.

Let each complex multiply take 4 operations and each complex add take 2 operations. One stage of interference cancellation requires subtracting the interference and computing the next decision. With hard decisions, the multiplication of the data estimate by the channel estimate for each user will be assumed to take 0 operations since the decision is a 1-bit complex number. The interference cancellation operation takes 78 complex multiplies and 78 complex subtractions since there are 78 interferers for each path of each user. Computing the decision statistic requires 2 complex multiplies and one complex add. This totals 946 operations per user per symbol or 2.42 BOPS.

Figure 8:
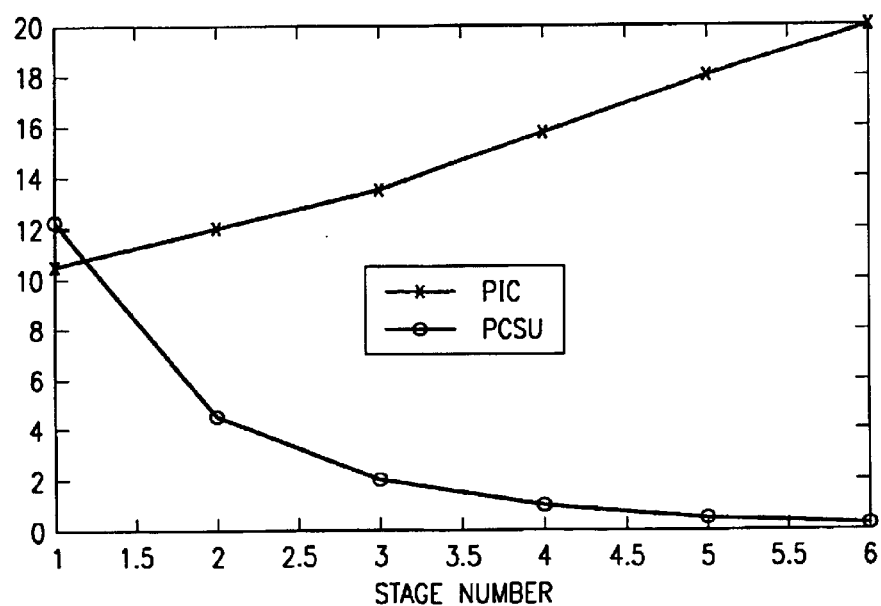
FIGS. 6–18 are simulation results.

With soft decisions with maximal ratio combining, the multiplication of the data estimates by the channel estimates requires 1 complex multiply per user per path (20.5 MOPS). The interference cancellation operation is the same as with hard decisions. Computing the decision statistic requires 2 complex multiplications, 1 complex add, 2 complex squares, 1 real add, 1 table lookup, and 2 real multiplications for a total of 19 operations. Adding up all the operations requires 959 operations per user per symbol or 2.46 BOPS. This is a negligible increase in complexity of 1.4%. If only one stage of cancellation is used, then it makes sense to use soft decisions. However, if hard decisions are used, it is easy to calculate the decision statistics for subsequent stages. Since only a small number of symbols change value from one stage to the next, the decision statistics can be computed by simply updating the effect of the bits that change. For example, if 10% of the symbols change from stage 1 to stage 2, then stage 2 could be performed with about 10% of the number of operations required for stage 1. This could not be done with soft decisions since all the soft decisions change from one stage to the next. FIG. 8 shows the percentage of bits that change from one stage to the next. With parallel interference cancellation, the percentage gradually increases from one stage to the next, while with PCSU the percentage of symbols which change decreases in each stage. Thus 6 stages of PCSU with hard decisions could be implemented with less computational complexity than is required for 2 stages of PCSU with soft decisions. However, stages 5 and 6 do little to decrease the BER, so there are diminishing returns as the number of stages is increased.

10. AWGN Simulations

Figure 9:
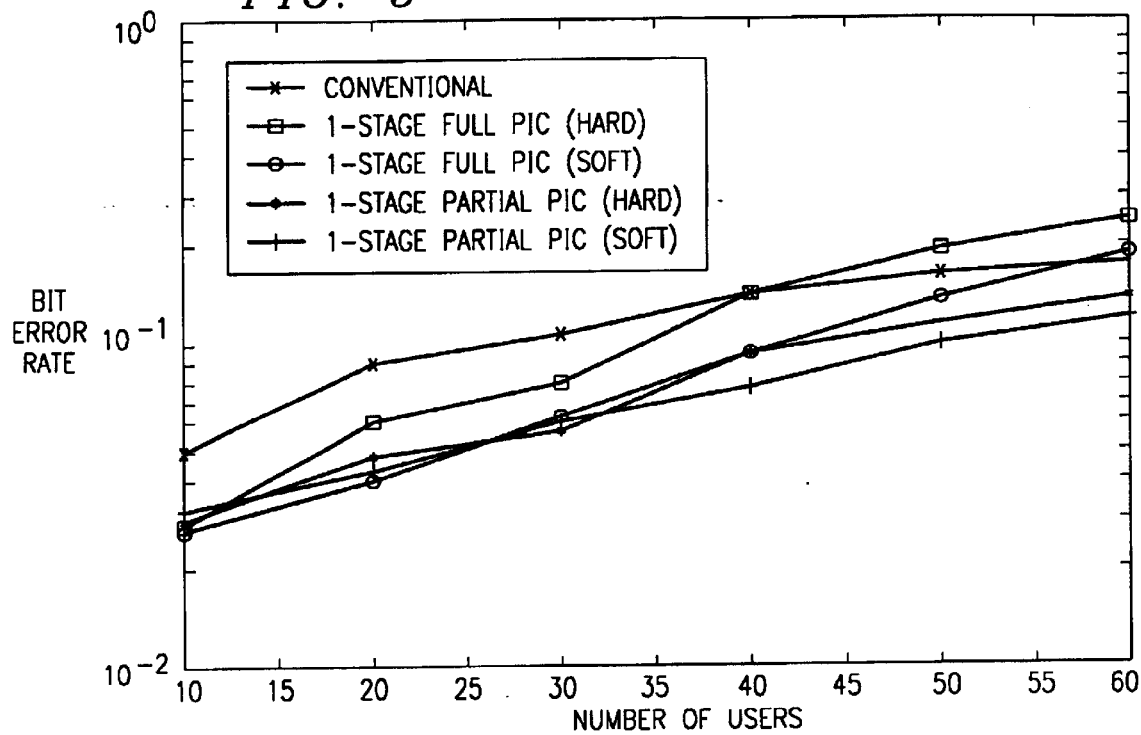

The various interference cancellation techniques were first simulated with a synchronous AWGN channel. This allows many techniques to be tested without an enormous computational burden. The $E_b/N_o$ for all simulations was set to 3 dB. This includes both additive white gaussian noise and interference from users outside the cell. This is an interference level which is representative of a heavily loaded system. Because there are a large number of weak interferers outside the cell, the interference is modeled as gaussian and included with the AWGN. The short codes for each user are selected from the Very Large Kasami set. The target BER for the AWGN channel was set to 10%. FIG. 9 shows the simulation results for the parallel interference canceller. With the conventional receiver 25 users can be supported at a BER of 10%. Full cancellation with either hard or soft decisions suffers from the bias problem and does not perform very well. Partial cancellation was performed with a cancellation of 70% of the interference. One stage of 70% cancellation with soft decisions allows the base station to support 50 users, which is a 100% increase in capacity.

Figure 10:
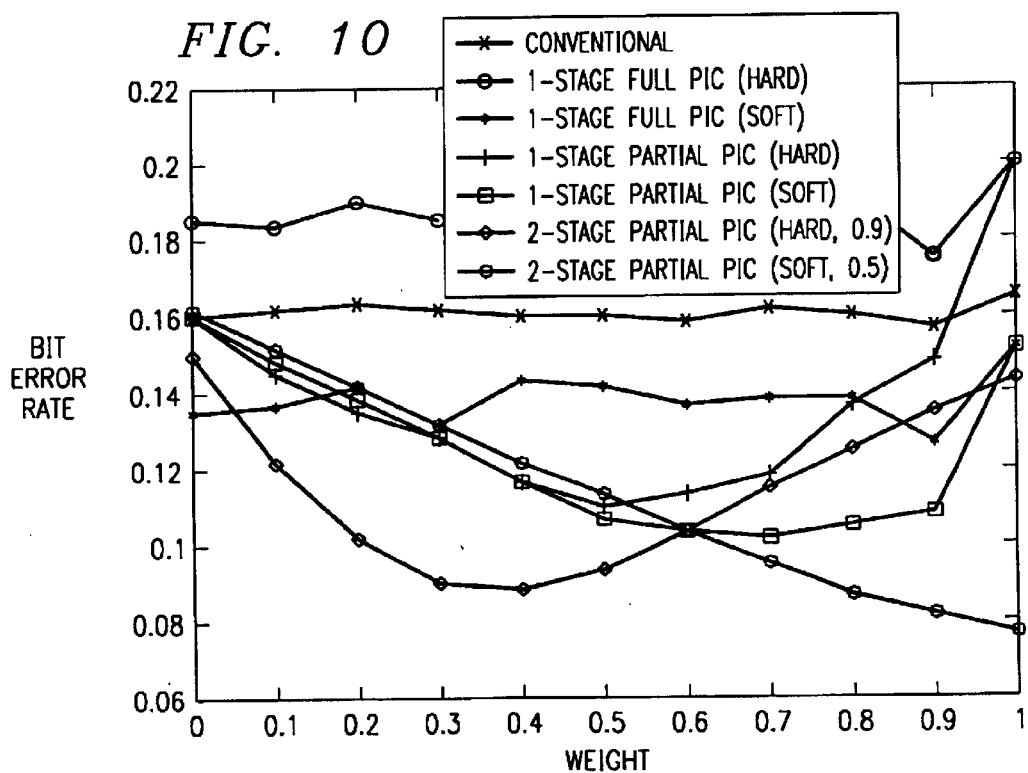

Additional simulations were performed with the number of users being kept constant at 50 with the amount of cancellation being varied. FIG. 10 shows the results using the PIC with 1 or 2 stages with different weights applied in each stage. These weights were chosen from the set 0.0, 0.1, ... 1.0, so for two stages 121 combinations of weights were tried. With the conventional detector, the SIR and BER can be calculated to be:

$$SIR_{AWGN} = \frac{s}{n + 49s/64} = \frac{1}{1/[2E_b/N_o] + 49/64} = 0.984$$

$$BER_{CONV-AWGN} = Q(\sqrt{SIR}) = Q(\sqrt{0.984}) = 0.16$$

This matches well with the simulation result for the conventional detector in FIG. 10. Using 1 stage of full interference cancellation with hard decisions performs worse than the conventional detector because of the bias problem, and full interference cancellation with soft decisions does not perform much better. With 1 stage the lowest BER with hard decisions (11%) is obtained with 50% cancellation, and with soft decisions the lowest BER (10%) is obtained with 70% cancellation. Additional improvement is obtained with 2 stages of cancellation. With hard decisions, it is best to weight the decision statistics of the two stages. In the first stage 90% of the interference should be cancelled. In the second stage 100% of the interference is cancelled, and then the final decision statistic is obtained by taking 60% of the first statistic and 40% of the second statistic to obtain a BER of 9%. With soft decisions, the best results are obtained with 50% cancellation in the first stage and 100% cancellation in the second stage. This reduces the BER from the original 16% to about 8%. The target BER is 10%, so 1 stage of PIC increases the capacity from 25 to 50 (100% increase), and 2 stages of PIC further increases the capacity. Simulations were not done with more than 50 users, so the exact capacity increase has not been calculated.

Figure 11:
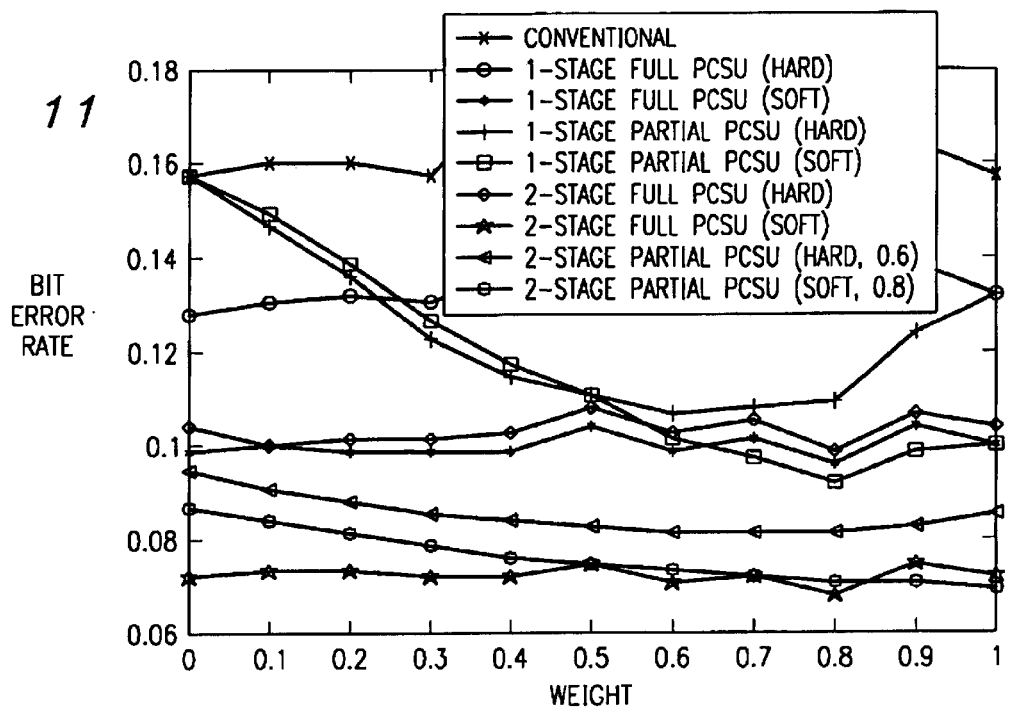

FIG. 11 shows the simulations using the PCSU method. The bias with full cancellation has been greatly reduced compared to the PIC case. With 1 stage of PCSU with hard decisions the lowest BER (10%) is obtained with 60% interference cancellation. With soft decisions the lowest BER (9.3%) is obtained with 80% cancellation. With 2 stages of PCSU and hard decisions, it is again best to weight the decision statistics of the two stages. In the first stage 60% of the interference should be cancelled. In the second stage 100% of the interference is cancelled, and then the final decision statistic is obtained by taking 20% of the first statistic and 80% of the second statistic to obtain a BER of 8.2%. With soft decisions, the best results are obtained with 80% cancellation in the first stage and 100% cancellation in the second stage. This reduces the BER from the original 16% to about 7%.

Figure 3B:
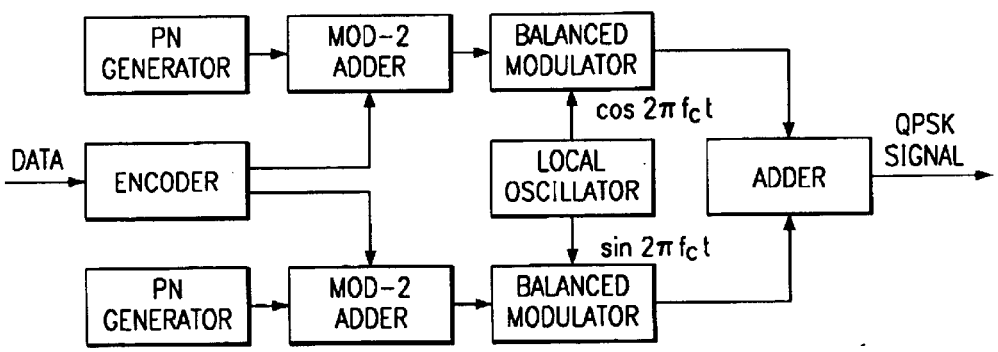
Figure 4:
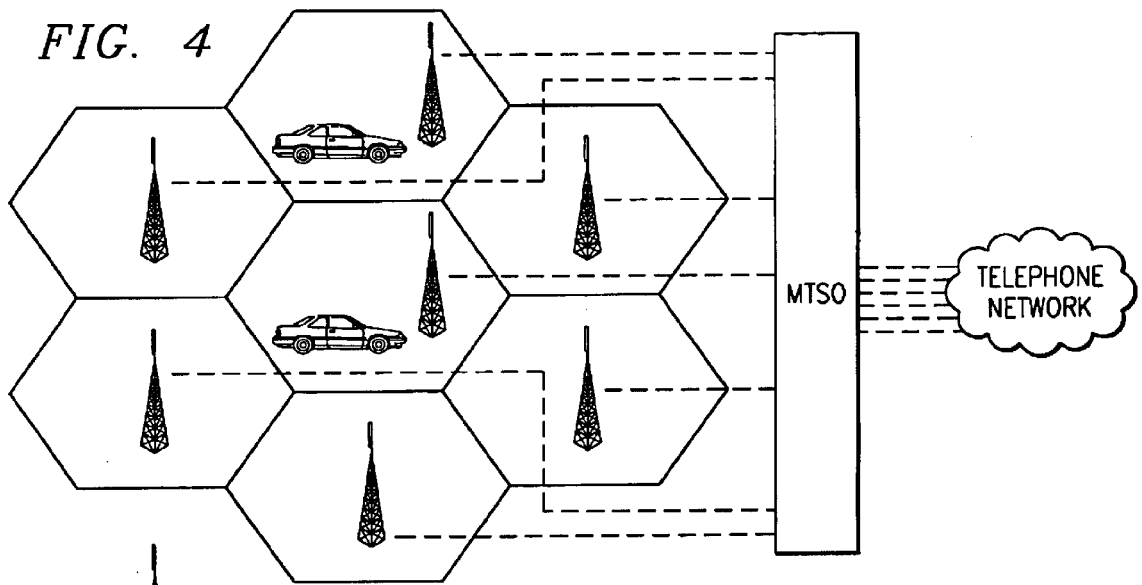
FIG. 4 shows a cellular system.
Figure 12:
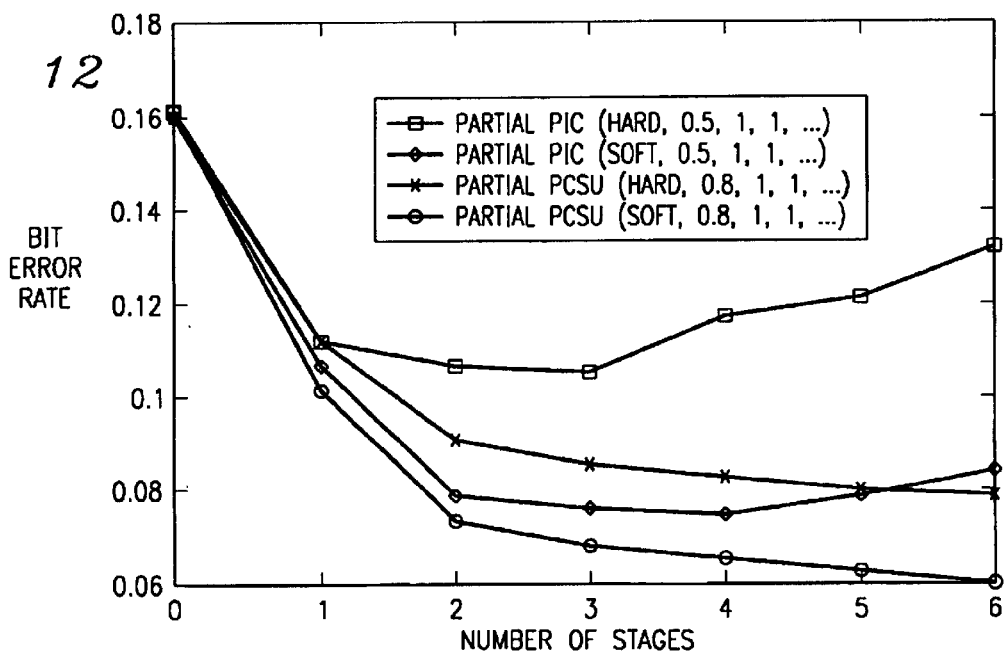

FIG. 12 shows the results when up to 6 stages of interference cancellation are used. The amount of cancellation in the first stage is 50% for PIC and 80% for PCSU. These values were chosen after finding the best weights for the soft decisions in FIGS. 3 and 4. In all cases, 100% cancellation is performed in subsequent stages. PCSU outperformed PIC in all cases, and soft decision outperformed hard decision. After a few stages of cancellation there was no further improvement in BER. With the PIC the BER actually started to get worse after 3 or 4 stages. One possible explanation for this behavior is that with an infinite number of stages the PIC will converge to the decorrelating detector, which may not perform as well as a few stages of PIC. Of course, if optimal weights could be chosen, it would not be possible to get worse performance in later stages because zero weight could be applied to these later stages. In any case, FIG. 5 suggests that interference cancellation should be limited to a few stages. With 2 stages an exhaustive search over all possible weights will give the best choice of weights. These weights depend on the channel models and the relative powers of the paths of each user.

11. Rayleigh Fading Simulations

Rayleigh fading simulations are useful to study the effect of both channel estimation and fading on the performance of the interference cancellers. In all the simulations presented here the base station receives two independently fading paths from each base station. All the paths arrive asynchronously, so all the path arrival times are chosen randomly. The base station is assumed to be able to determine the exact arrival times of all the paths. The average power of both the paths was the same, and the average power received from each mobile was the same. The latter assumption is justified because reverse-link power control will attempt to equalize the received powers of all the users. The independently fading paths were simulated by passing a large number of AWGN sequences through a low-pass filter that generates the Doppler spectrum. The simulations used fading with a Doppler frequency of 80 Hz or 200 Hz. For the 2-path Rayleigh channel, a BER of 12% will lead to a BER of 1e-3 after Viterbi decoding.

Figure 13:
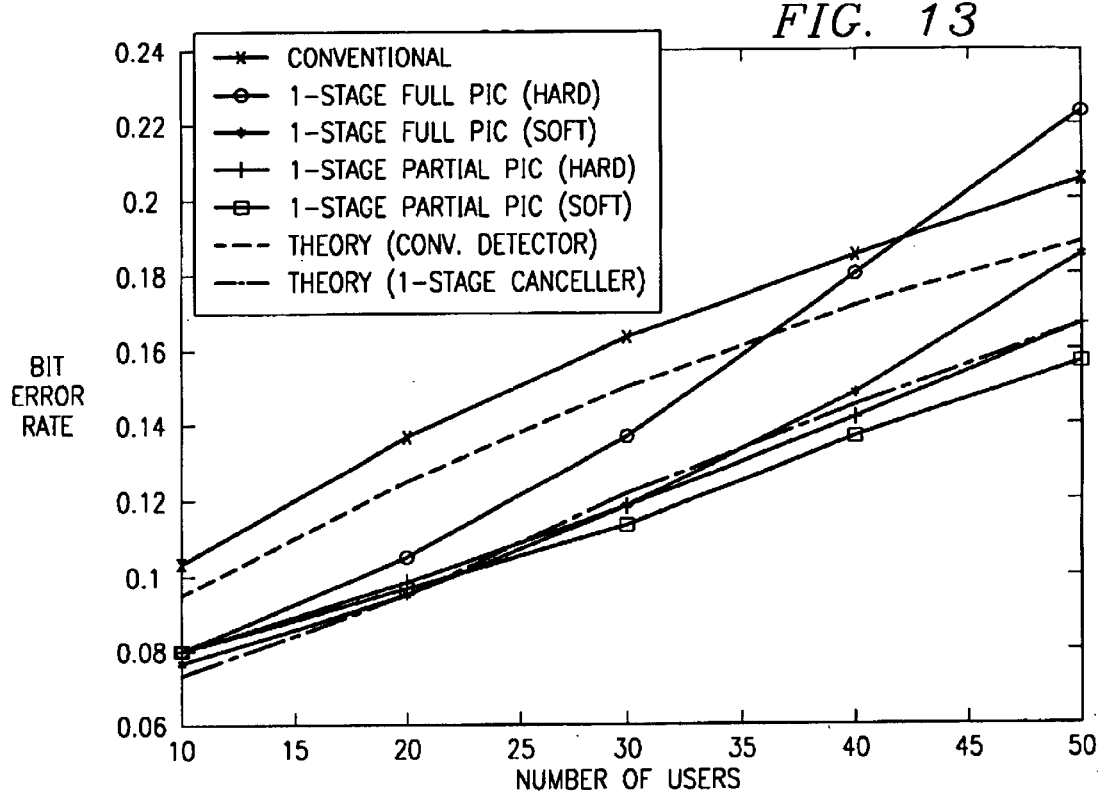

FIG. 13 shows the simulation results for the 2-path Rayleigh fading channels with 80 Hz fading. At the target BER of 12%, 15 users can be supported. The dashed line for the theoretical curve does not include the effect of channel estimation, and the difference between the curve for the conventional simulation and the theoretical curve is due to imperfect channel estimation. Using iterative channel estimation gives a small improvement, but with 40 or 50 users there is still a large gap due to imperfect channel estimation.

Figure 14:
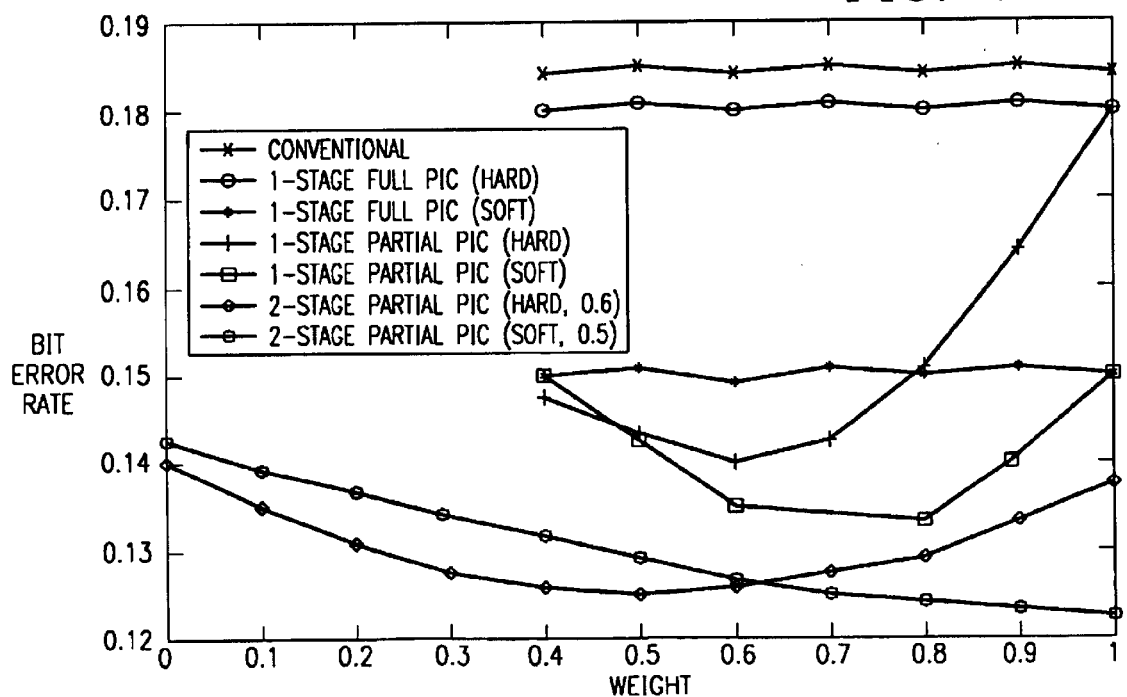

FIG. 14 shows the results with 80 Hz Doppler and with 1 or 2 stages of parallel interference cancellation with different weights applied in each stage. As with the AWGN case, full cancellation with either hard or soft decisions suffers from the bias problem. With 1 stage of cancellation with hard decisions, the lowest BER (14%) is obtained with 60% cancellation. With soft decisions and 80% cancellation a BER of 13.5% is achievable. With 2 stages and hard decisions, the best results are obtained by canceling 60% of the interference in the first stage and 100% in the second stage and averaging these two decision statistics for a BER of 12.5%. With 2 stages and soft decisions, the lowest BER (12.3%) is obtained by canceling 50% of the interference in the first stage and 100% of the interference in the second stage. Note that this BER is still higher than the target BER of 12%, so 40 users could not be supported with this type of interference cancellation.

Figure 15:
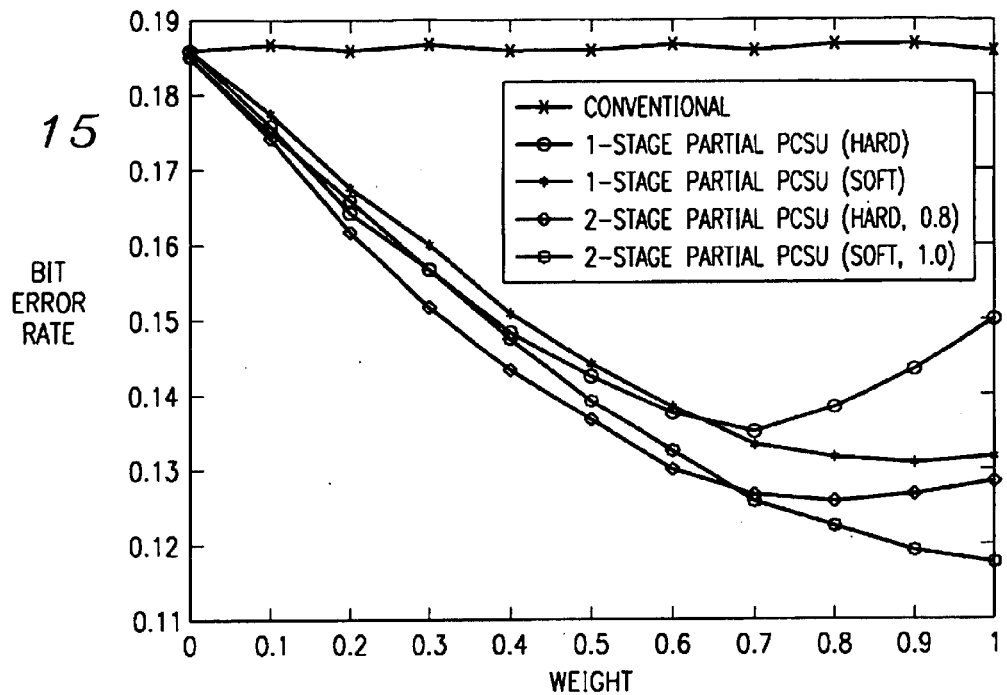

FIG. 15 gives the results with 80 Hz Doppler and PCSU instead of PIC. With PCSU the effect of the bias is greatly reduced, and full cancellation does not perform too poorly. The best results with 1 stage of PCSU with hard decisions are obtained with 70% cancellation and gives a BER of 13.6%. With soft decisions and 90% cancellation a BER of 13.2% is achieved. With 2 stages and hard decisions, the lowest BER (12.5%) is obtained with 80% cancellation in both stages. With soft decision and 100% cancellation in both stages, a BER of 11.7% is obtained. This is below the target BER of 12%, so at least 40 users can be supported with this technique. The capacity gain is about 170%.

Figure 16:
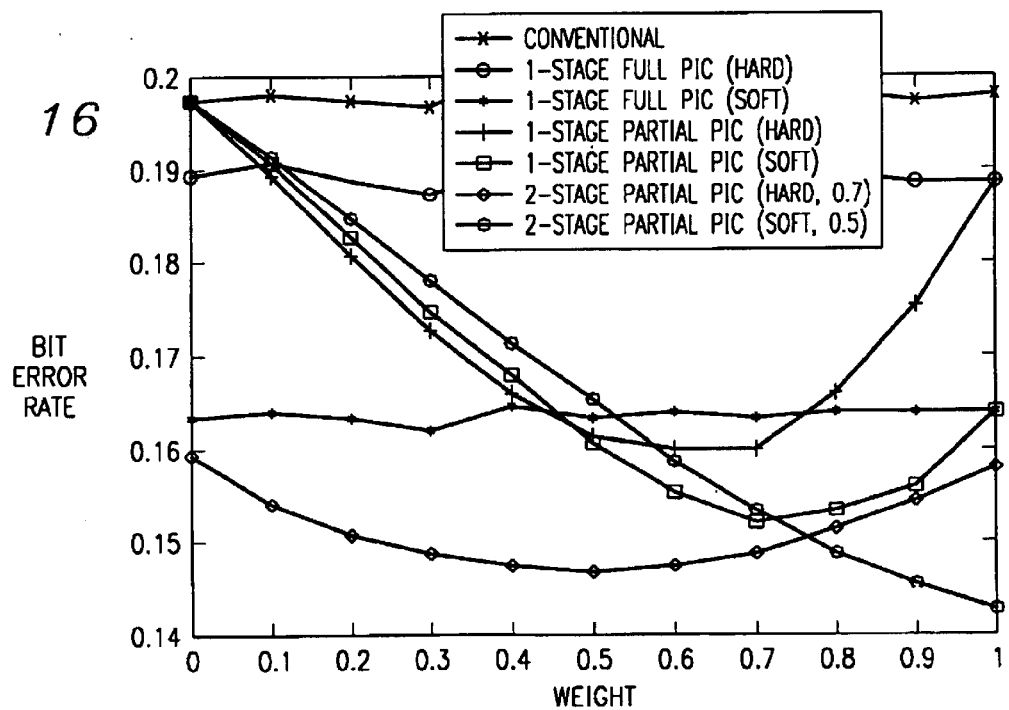

FIG. 16 shows the results for PIC With 200 Hz Doppler. This case was simulated to determine if the interference cancellation weights vary much with different Doppler frequencies. The overall bit error rates are higher with 200 Hz because channel estimation gets worse with higher Doppler frequency. However, the best weights are almost the same as with the 80 Hz Doppler.

Figure 17:
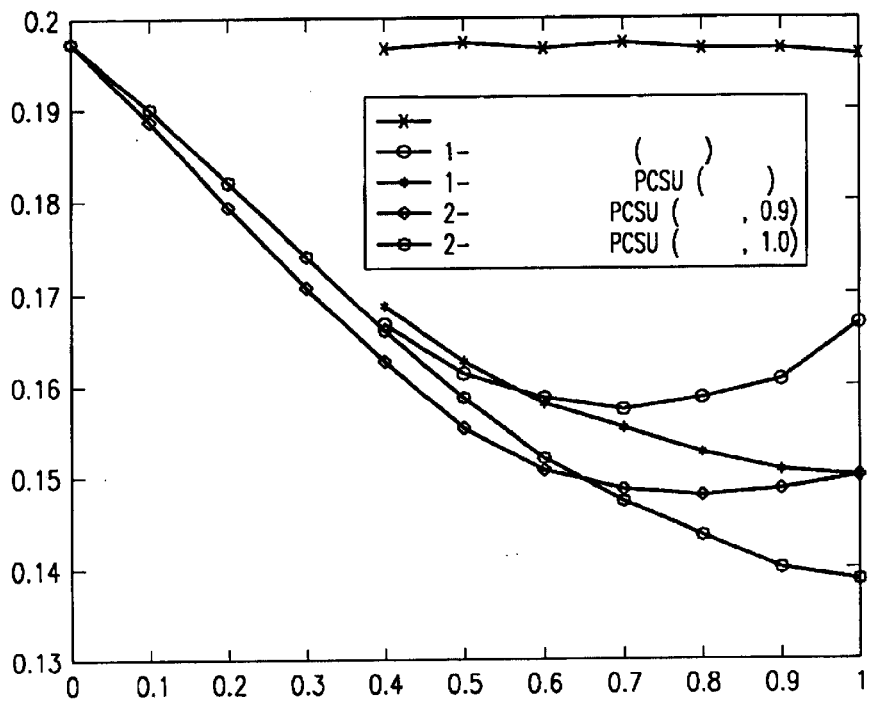

FIG. 17 shows the results for PCSU with 200 Hz Doppler. Again, the overall bit error rates are higher with 200 Hz because channel estimation gets worse with higher Doppler frequency, but the best weights are almost the same as with the 80 Hz Doppler.

Figure 18:
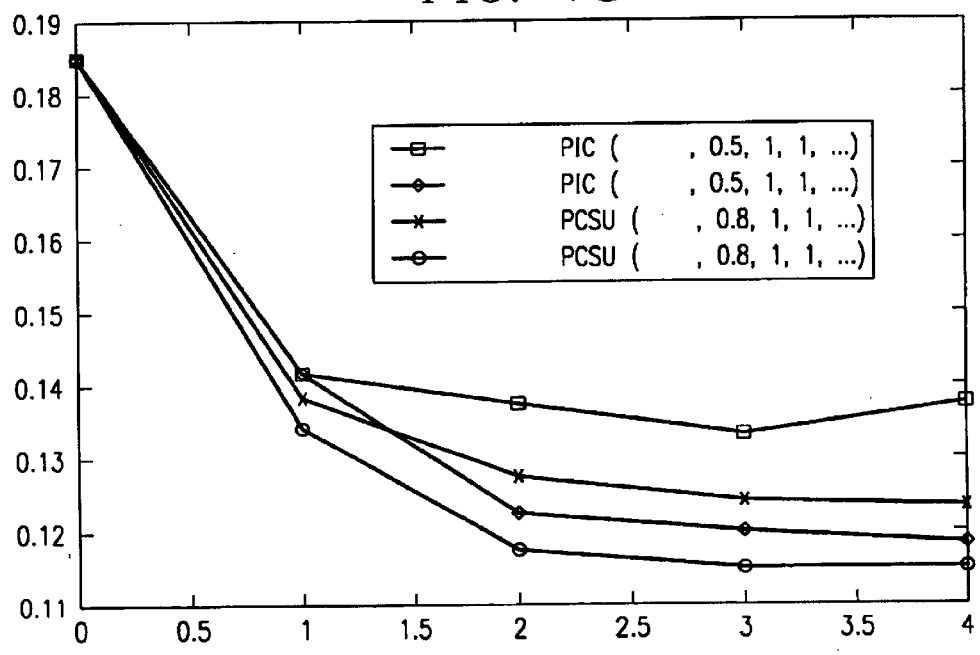

FIG. 18 shows the performance of both PIC and PCSU with many stages. In the first stage 50% of the interference is cancelled for PIC and 80% of the interference is cancelled for PCSU. These values were chosen after finding the best weights for PIC and PCSU from FIGS. 7 and 8. In subsequent stages 100% of the interference is cancelled. Just as with the AWGN case, there is not much improvement after 2 stages. The PCSU technique is superior to the standard PIC in all cases.

The simulations show that soft decision performs better that hard decision with a penalty of less than 2% in added complexity if only one stage is used. However, multiple stages with hard decisions can be implemented by simply updating the bits that change is each stage, which greatly reduces the computation required. Both methods perform about the same with the same level of complexity, so the decision of which one to implement will depend upon the particular architecture chosen. PCSU has the same level of complexity as PIC but outperforms PIC in all cases. Using PCSU and 2 stages of cancellation results in a capacity increase of about 170%, and using PCSU with soft decisions has the advantage that the best results are obtained with 100% cancellation in each stage. The BER with PCSU may not be exactly the same with each user, but the power control loops attempt to ensure that each user has the same BER. Since the BER curves versus $E_b/N_o$ are fairly linear for small differences in BER, the average BER seems to be the appropriate metric to measure the performance of PCSU. PCSU may be improved further by gradually increasing the weights within a stage as the decisions become more reliable. PCSU is also a good technique when users have different quality of service requirements. It takes about 2 dB more $E_b/N_o$ to obtain a BER of 1e-6 than it takes for a BER of 1e-3. With PCSU the users with higher $E_b/N_o$ can be the first ones updated during an iteration.

12. Modifications

The preferred embodiments can be modified in various ways while retaining the features of parallel interference cancellation with use of updated estimates within iteration. For example, in the TDD (time division duplex) mode of WCDMA, interference cancellation can be performed at the mobile user. The base station transmits signals to one or more mobile users using different codes, and orthogonality is lost because of multipath. The mobile user performs interference cancellation on the signal received from the base station. Similarly, the mobile user can perform interference cancellation in the FDD (frequency division duplex mode).

What is claimed is:

1. A method of reception for interfering signals, comprising:

(a) detect signals encoding information $u_1, \ldots u_n$ where n is a positive integer;

(b) estimate said $u_1, \ldots u_n$ from the results of step (a); and then (c) for each k in the range 1 to n:
  (i) estimate the interference of said signals on said detection of step (a) for information $u_k$;
  (ii) adjust the estimate of said $u_k$ using the estimate of step (c)(i);

(d) repeat step (c) wherein for substep (c)(i) said estimate of the interference uses the results of substep (c)(ii) for said $u_j$ for j<k; and (e) decide values for said $u_1, \ldots u_n$ from the results of step (d).

2. The method of claim 1, wherein:
(a) said detect signals of step (a) of claim 1 includes projection of said signals onto codes associated with said information $u_1, \ldots, u_n$.

3. The method of claim 1, wherein:
(a) said adjust the estimate of substep (c)(ii) of claim 1 includes use of the estimate of said $u_k$.

4. The method of claim 1, wherein:
(a) said detect signals of step (a) of claim 1 includes maximal ratio combining of signals relating to a single information $u_k$.

5. The method of claim 1, wherein:
(a) said adjust the estimate of substep (c)(ii) of claim 1 is a soft decision.

6. The method of claim 1, wherein:
(a) said signals of step (a) of claim 1 arise from a single source.

7. A receiver for multiple interfering signal streams, comprising:
(a) detectors $D_1, \ldots, D_n$ for signals $S_1, \ldots, S_n$ where n is a positive integer, with said signals $S_1, \ldots, S_n$ encoding information $u_1, \ldots u_n$;
(b) first estimators $FE_1, \ldots, FE_n$ and second estimators $SE_1, \ldots, SE_n$ with inputs of said first estimator $FE_k$ from (i) said detector $D_k$ and (ii) said second estimator $SE_k$, said first estimators capable of estimating said $u_1, \ldots u_n$;
(c) said second estimator $SE_j$ with inputs from all of said first estimators $FE_i$ for i less than or equal to j, said second estimators $SE_j$ capable of estimating interference of said signals; and
(d) a controller to iterate outputs from said second estimators back to said first estimators.

8. The receiver of claim 7, wherein:
(a) said first estimators $FE_k$ include inputs of feedback from output of said $FE_k$.

9. The receiver of claim 7, wherein:
(a) said first estimators, said second estimators, and at least in part said detectors are implemented as a programmable processor together with a program.

10. The receiver of claim 7, wherein:
(a) said detectors include a RAKE detector.

11. The receiver of claim 7, wherein:
(a) said detectors include code projectors associated with said signals.

\* \* \* \* \*